Figure 1:
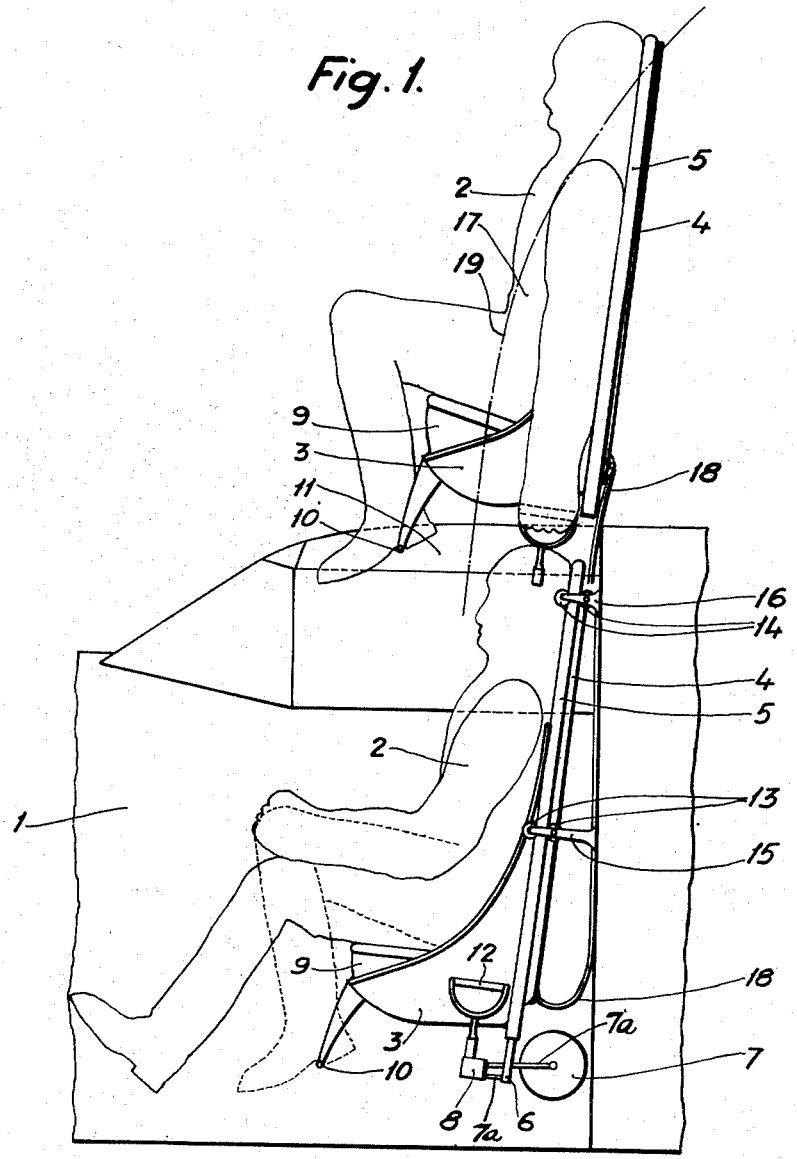

Oct. 3, 1950 — E. NORDQUIST — 2,524,355
EJECTING DEVICE FOR PARACHUTISTS
Filed Aug. 14, 1945 — 2 Sheets-Sheet 2

Inventor
E. Nordquist
By Hanard Downing Huxle
Attys

Patented Oct. 3, 1950

2,524,355

UNITED STATES PATENT OFFICE 2,524,355

EJECTING DEVICE FOR PARACHUTISTS

Elis Nordquist, Linkoping, Sweden

Application August 14, 1945, Serial No. 610,820
In Sweden October 17, 1941

Section 1, Public Law 690, August 8, 1946
Patent expires October 17, 1961

3 Claims. (Cl. 244—122)

When either in case of emergency or for some other reason, one or more members of an aircraft crew performs a parachute jump there is the danger of the parachutist, who is caught at the leap by the relative wind, being hit by rear portions of the aircraft such as the fin or the rudder or by a rotating airscrew located behind the jumping point as in aircrafts with pusher airscrews.

The German Patent No. 711,045 relates to a device whereby this risk is eliminated or reduced. Said device consists of a chair provided with a parachute and intended for the parachutist, which chair can be ejected from the aircraft by means of some suitable power accumulating device. The occupant is detachably fastened to the chair which latter is shaped to surround him on three sides. The occupant is also provided with a separate parachute. When going to perform a parachute jump the occupant of the chair first raises or removes the roof of the cabin. The ejector is then actuated and throws the chair backwards and upwards from the air craft so that the chair with its occupant goes clear of the rear portions of the aircraft. Then the parachute of the chair is opened, either automatically or manually, it being then possible for the parachutist to release himself from the chair by loosening the fastening means and to let his own parachute unfold.

The chair being thus provided with a separate parachute eliminates that risk of damaging people, animals and other objects on the ground which would be a consequence of letting the chair fall freely. On the other hand, the parachute of the chair necessarily occupies part of the interior space of the aircraft, the parachute and the means for fastening the same to the chair moreover constituting an additional weight of the chair. Further, there is, of course, the risk of the parachute of the chair for some reason not opening at the descent.

The present invention relates to an improved parachute jump ejector of the kind above described whereby the said drawbacks are eliminated to a large extent. The invention relates more particularly to an aircraft parachute jump ejector in which a chair intended for the parachutist is accelerated at the leap in some suitable way in such direction relative to the aircraft that the parachutist is ejected from the aircraft without contacting with the rear portions of the aircraft, said ejector being characterized thereby that one or more tubes, connected with the chair and running outside tubes stationary relative to the aircraft, are adapted to be forced away from the stationary tubes by an overpressure produced in the spaces between the closed tops of said movable tubes and corresponding stationary tubes, the said movable tubes at the same time bringing along the chair.

Figure 2:
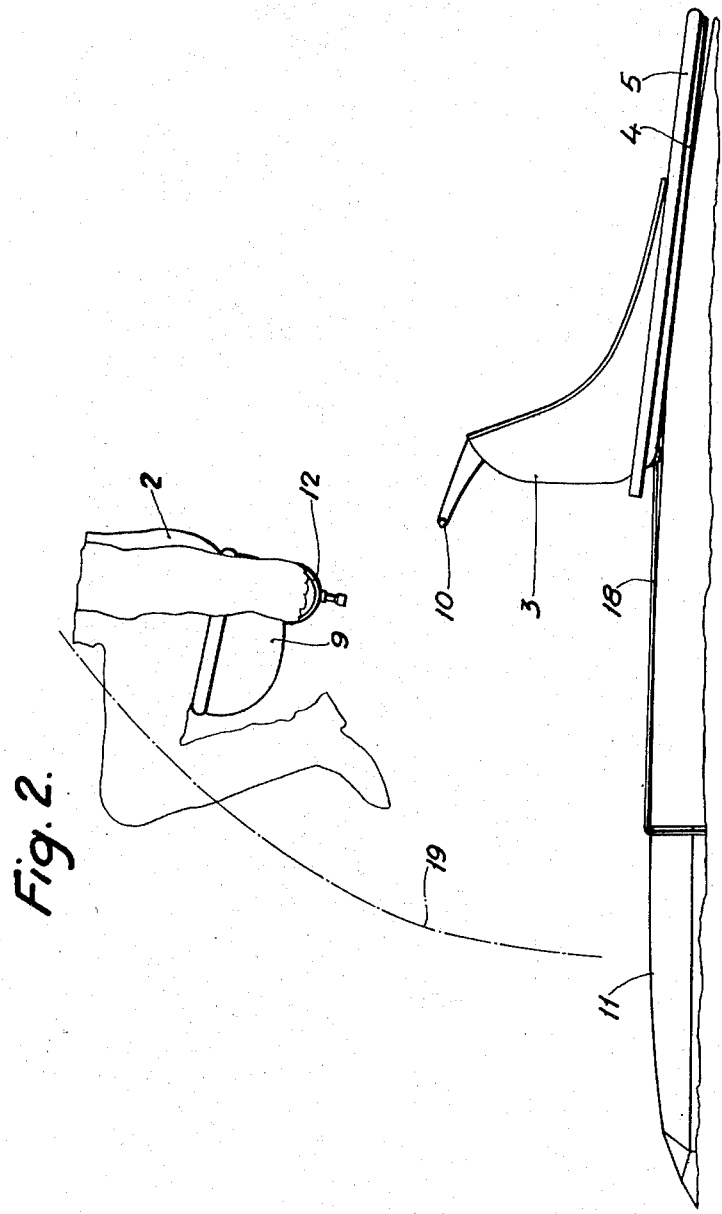

One embodiment of the present invention will be described hereinafter, reference being had to the accompanying drawings, in which Fig. 1 shows part of the cabin of an aircraft, particularly an aeroplane, with a chair for parachute jumps, and Fig. 2 shows how the chair in accordance with the invention is retained on the fuselage by means of ropes or the like after the parachutist has been ejected.

Reference numeral 1 designates the cabin of an aircraft wherein a member 2 of the crew is seated on his parachute 9 in a chair 3 of usual shape with a relatively high back 4. At a parachute jump of the crew member the chair 3 is intended to receive such an acceleration from a special ejector that the crew member is thrown out of the aircraft. The said ejector comprises two tubes 5 attached to the rear side of the chair and closed at their upper ends. The tubes 5 extend in the direction of the intended jump and are slidably mounted over two other tubes 6 fixed in a lower part of the aircraft and having closed lower and open upper ends. The chair, consequently, is movable in the vertical direction by the tubes 5 being slidable on the tubes 6. In the aircraft there is also provided a tank 7 for compressed air which can be connected through pipes 7a with the interior of the telescopic tubes 5 and 6 by opening a valve 8.

When the crew member, in this case the pilot, for some reason intends to perform a parachute jump he first places his feet on two stirrups 10 connected with the chair, this being shown in Fig. 1 in dashed lines, and then, if necessary, loosens the fastening straps. Then he raises or throws off the roof 11 of the cabin, the next step being to open the valve 8 by pulling the handle 12 upwardly. The compressed air now flows from the tank 7 through valve 8 to the space confined by the tubes 5 and 6, the tubes 5 being thus forced upwardly by the compressed air at the same time taking along the chair 3 with the crew member 2 occupying the same.

The tubes 5 are supported on both sides by rollers 13 and 14 mounted on brackets 15 and 16 protruding from the wall of the cabin, said rollers absorbing reaction forces emanating from acceleration force and air forces.

Towards the end of the acceleration process, when the tubes 5 have almost slid off the interior tubes 6, the moments of the air forces and the acceleration forces acting on the chair 3 with the crew member 2 will approximately counterbalance one another, the tubes 5 and 6, consequently, being not subjected to any unnormal bending stresses.

As soon as the chair 3 has been thrown outside the cabin into the free air and the tubes 5 have slipped off the tubes 6, this position of the chair being indicated by the upper finger 17, the relative wind will catch the chair which has a relatively small mass and catches a great deal of wind in comparison with the crew member sitting on the same. The chair is now moved backwards relative to the aircraft. According to the present invention the chair 3 is preferably attached to the aircraft by means of one or more ropes 18, the chair tipping therefore over on the outside of the aircraft behind the cabin, as will be clear from Fig. 2 which shows part of the aircraft immediately behind the cabin. In this way the chair is prevented from striking against any rear portions of the aircraft and thus, from causing slivers which might wound the ejected crew member. Further, in case the aircraft falls into a nose dive, thus necessitating the parachute jump, the chair is prevented from descending to the ground at another place than the aircraft itself. Finally, the chair is prevented from hitting other members of the crew behind the first-mentioned one that may be trying to rescue themselves in the same way.

The ejected crew member 2 continues in a parabolic path 19 backwards relative to the aircraft, which path, of course, must be so calculated that the parachutist does not strike against any rear portion of the aircraft.

As indicated above, other members of the crew, or at least those who are so positioned in the aircraft that they run the risk of striking against rear portions of the aircraft at jumping, may be seated on similar chairs as above described whereby, in case of emergency, they will be able to rescue themselves in the same manner.

When using fewer chairs with ejectors than there are members of the crew it is also possible to arrange one or more of the chairs in such manner that the chair is stopped by a suitable buffer-device before the tubes 5 have quit slid off the tubes 6, the chair being then brought down to the initial position, whereby a similar jump of the next crew member is enabled.

The present invention is naturally not limited to the embodiments now described. For actuating the chair there may be provided two or more movable tubes with corresponding stationary tubes which movable tubes, for the purpose of obtaining a better guiding action, are arranged at some distance from one another. The stationary tubes may be provided with channels through which compressed air is supplied to the spaces between the movable tubes and their corresponding stationary tubes. Further, the overpressure in the spaces between the movable tubes connected with the chair and the stationary tubes may be created by the gases from the combustion of a powder charge.

Should it be deemed suitable, the chair 3, instead of being ejected upwards and backwards, may, for example be thrown out sidewards.

Having now described my invention, what I claim as new and desire to secure by Letters Patent is:

1. An aircraft parachute jump ejector comprising a movable seat for the parachutist, a plurality of movable tubes attached to the seat at a substantial distance from one another, spaced stationary tubes telescopically engaging the movable tubes, each of said movable and stationary tubes being closed at its end remote from its engaging tube, valved means for connecting said stationary tubes to a source of pressure fluid for supplying fluid to the space confined by the movable and stationary tubes, said pressure fluid being operable to displace the movable tubes, together with the seat, in such a direction relative to the aircraft that the parachutist is ejected from the aircraft clearing the rear portion of the aircraft.

2. An aircraft parachute jump ejector comprising a movable seat for the parachutist, a plurality of vertically movable tubes attached to the seat at a substantial distance from one another, and having their upper ends closed, spaced stationary tubes telescopically engaging said movable tubes, and having their lower ends closed, valved means for connecting the lower portions of the stationary tubes to a source of pressure fluid for supplying fluid to the space confined by the movable and stationary tubes, said pressure fluid being operable to displace said movable tubes, together with the seat, in such a direction relative to the aircraft that the parachutist is ejected from the aircraft clearing the rear portion of the aircraft.

3. An aircraft parachute jump ejector comprising a seat for the parachutist, a plurality of vertically movable cylinders attached to the seat at a substantial distance from one another, and having closed upper ends, vertical, stationary cylinders having closed lower ends, each of said movable cylinders telescopically engaging one of said stationary cylinders, and means to produce a pressure in the gas in the spaces between the top of each movable cylinder and the bottom of the corresponding stationary cylinder, said pressure forcing away said movable cylinders together with the seat along said stationary cylinders with such an acceleration and in such a direction relative to the aircraft that the parachutist is ejected from the aircraft clearing the rear portion of the aircraft.

E. NORDQUIST.

REFERENCES CITED

The following references are of record in the file of this patent:

UNITED STATES PATENTS

| Number | Name | Date |
|---|---|---|
| 1,337,336 | Townsley | Apr. 20, 1920 |
| 1,874,237 | Bruno | Aug. 30, 1932 |
| 2,331,309 | Curriston | Oct. 12, 1943 |

FOREIGN PATENTS

| Number | Country | Date |
|---|---|---|
| 179,936 | Switzerland | Mar. 2, 1936 |
| 364,806 | Italy | Nov. 15, 1938 |
| 829,331 | France | Mar. 28, 1938 |